(12) United States Patent
Kitamura et al.

(10) Patent No.: US 10,530,211 B2
(45) Date of Patent: Jan. 7, 2020

(54) COIL WINDING COMPONENT AND ROTARY ELECTRIC MACHINE

(71) Applicant: HONDA MOTOR CO., LTD., Minato-ku, Tokyo (JP)

(72) Inventors: Kenji Kitamura, Tochigi-ken (JP); Tomotsugu Takahashi, Tochigi-ken (JP)

(73) Assignee: HONDA MOTOR CO., LTD., Tokyo (JP)

(*) Notice: Subject to any disclaimer, the term of this patent is extended or adjusted under 35 U.S.C. 154(b) by 100 days.

(21) Appl. No.: 15/937,941

(22) Filed: Mar. 28, 2018

(65) Prior Publication Data

US 2018/0287447 A1 Oct. 4, 2018

(30) Foreign Application Priority Data

Mar. 31, 2017 (JP) ................. 2017-069723

(51) Int. Cl.
| | |
|---|---|
| H02K 3/34 | (2006.01) |
| H02K 3/50 | (2006.01) |
| H02K 1/14 | (2006.01) |
| H02K 3/32 | (2006.01) |
| H02K 15/02 | (2006.01) |
| H02K 15/10 | (2006.01) |
| H02K 15/12 | (2006.01) |

(52) U.S. Cl.
CPC ............. *H02K 3/345* (2013.01); *H02K 1/148* (2013.01); *H02K 3/325* (2013.01); *H02K 15/022* (2013.01); *H02K 15/10* (2013.01); *H02K 15/12* (2013.01)

(58) Field of Classification Search
CPC .......... H02K 3/34; H02K 3/345; H02K 1/148; H02K 3/325; H02K 3/52–3/528
USPC .................................. 310/196, 214, 215, 71
See application file for complete search history.

(56) References Cited

U.S. PATENT DOCUMENTS

| | | | |
|---|---|---|---|
| 7,569,958 B2* | 8/2009 | Matsuzaki | ............. H02K 3/524 310/43 |
| 2012/0267979 A1* | 10/2012 | Yoshida | ................ H02K 3/522 310/214 |

FOREIGN PATENT DOCUMENTS

JP 2016-116417 6/2016

* cited by examiner

*Primary Examiner* — Thomas Truong
(74) *Attorney, Agent, or Firm* — Amin, Turocy & Watson, LLP

(57) ABSTRACT

An insulator of a coil winding component constituting part of a rotary electric machine is resin molded integrally with a divided iron core. A first accommodating groove in which a coil terminal wire can be arranged is formed on an outer end surface of a wiring member of the insulator. A plurality of recesses are formed in a circumferential direction of a stator core on a groove bottom surface of the first accommodating groove. Further, a rib, which supports the coil terminal wire that is arranged in the first accommodating groove, is disposed between the mutually adjacent recesses.

10 Claims, 9 Drawing Sheets

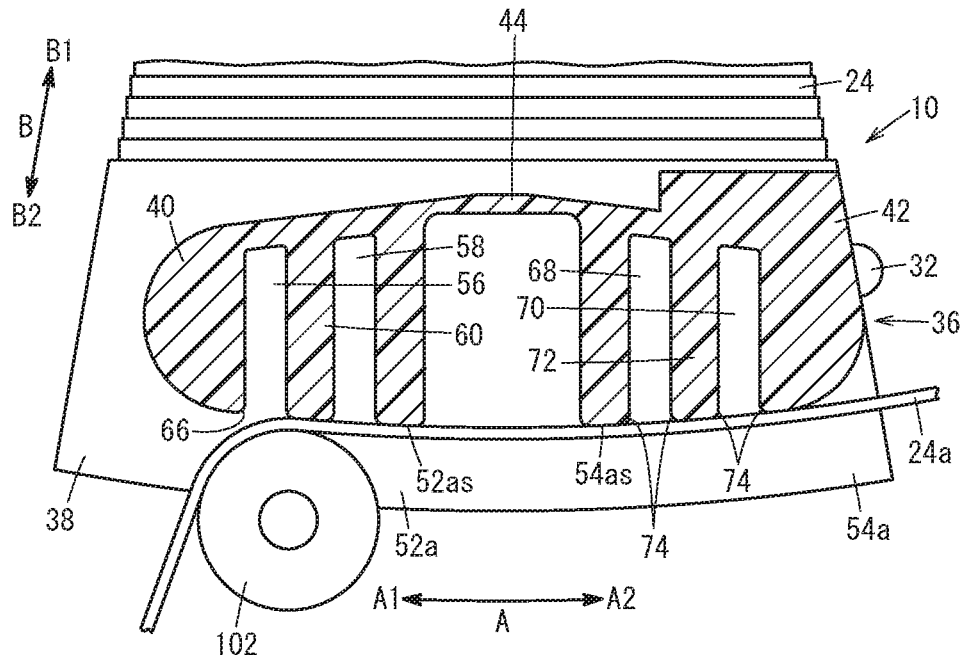
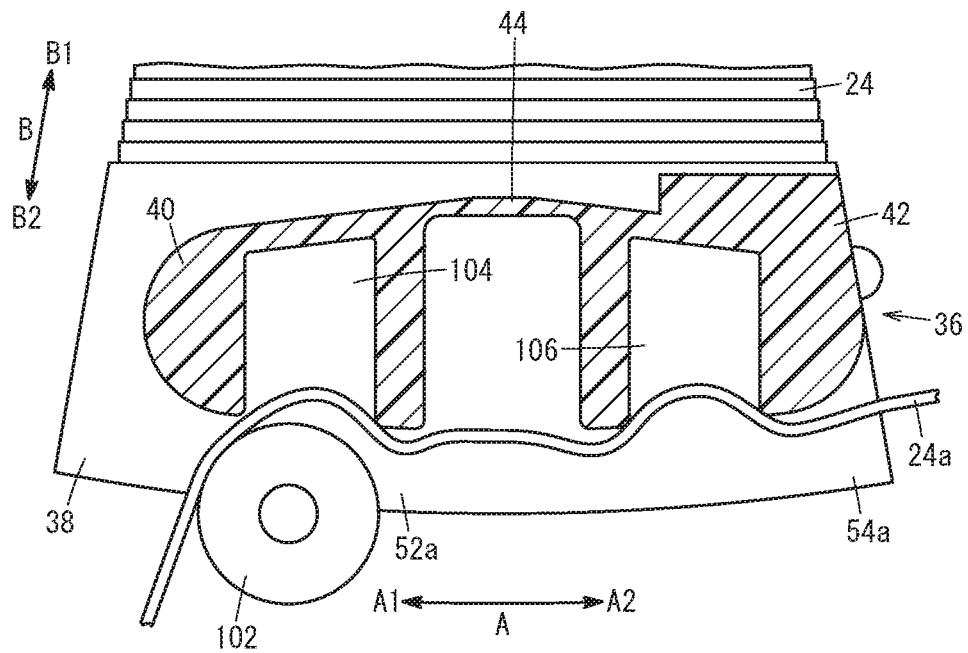

COIL WINDING COMPONENT AND ROTARY ELECTRIC MACHINE

CROSS-REFERENCE TO RELATED APPLICATION

This application is based upon and claims the benefit of priority from Japanese Patent Application No. 2017-069723 filed on Mar. 31, 2017, the contents of which are incorporated herein by reference.

BACKGROUND OF THE INVENTION

Field of the Invention

The present invention relates to a rotary electric machine, and a coil winding component thereof equipped with a divided iron core, and a resin insulator, which is resin molded integrally with the divided iron core in surrounding relation to a portion of the divided iron core.

Description of the Related Art

For example, in Japanese Laid-Open Patent Publication No. 2016-116417, a coil winding component is disclosed in which a resin insulator is resin molded integrally with a divided iron core, and a coil is wound via the insulator around a tooth portion of the divided iron core.

SUMMARY OF THE INVENTION

Incidentally, the insulator of a rotary electric machine includes a wiring member, which is disposed so as to cover a yoke portion of the divided iron core from an axial direction of the stator core, and accommodating grooves, which extend along a circumferential direction of the stator core, and through which coil terminal wires drawn out from the coil are guided, are formed on an outer end surface of the wiring member in a radial outward direction of the stator core.

In the event that an insulator of this type is resin molded integrally with the divided iron core, since the wiring member covers the yoke portion, it is impossible to pull out a hollow portion molding die for forming a hollow portion (hollow hole) in the wiring member to a side where the yoke portion is located.

If the hollow portion is not formed in the wiring member, then an amount of shrinkage of the resin becomes relatively large at the time of molding the insulator, and therefore, there is a problem in that the molding accuracy of the insulator is lowered. In the case that the hollow portion molding die is pulled outwardly in the radial direction of the stator core in order to form the hollow portion in the wiring member, a recess is formed in a bottom surface of the accommodating groove. Upon doing so, when the coil terminal wire is arranged in the accommodating groove, a portion of the coil terminal wire enters into the recess, and there is a concern that, in reaction thereto, locations of the coil terminal wire positioned on both sides of the recess will bulge outwardly in the radial direction of the stator core.

The present invention has been devised taking into consideration such problems, and has the object of providing a rotary electric machine and a coil winding component thereof, which is capable of suppressing a deterioration in the molding accuracy of insulators, while also preventing portions of coil terminal wires from bulging outwardly in a radial direction of the stator core, even in the case that the insulators are resin molded integrally with the divided iron cores.

In order to achieve the aforementioned object, a coil winding component according to the present invention is equipped with a divided iron core, and a resin insulator, which is resin molded integrally with the divided iron core in surrounding relation to a portion of the divided iron core, wherein a stator core of a stator is constituted by arranging a plurality of the divided iron cores in an annular shape, and a coil is capable of being wound via the insulator around a tooth portion of the divided iron core, and further wherein the insulator includes a wiring member, which is disposed so as to cover a yoke portion of the divided iron core from an axial direction of the stator core, and an accommodating groove, which extends along a circumferential direction of the stator core, and in which a coil terminal wire drawn out from the coil can be arranged, is formed on an outer end surface of the wiring member in a radial outward direction of the stator core, a plurality of recesses are formed in the circumferential direction of the stator core on a groove bottom surface of the accommodating groove, and a rib, which supports the coil terminal wire that is arranged in the accommodating groove, is disposed between the mutually adjacent recesses in the circumferential direction of the stator core.

According to such a configuration, since the plurality of recesses that are formed in the groove bottom surface of the accommodating groove function as hollow portions of the wiring member, it is possible to reduce the amount of resin shrinkage of the wiring member, in comparison with a case in which such recesses are not formed at the time of molding the insulator. Consequently, even if the insulator is resin molded integrally with the divided iron core, it is possible to suppress a deterioration in the molding accuracy of the insulator. Further, since the rib is disposed between the mutually adjacent recesses in the circumferential direction of the stator core, it is possible to suppress the coil terminal wire from entering into the recesses. Thus, it is possible to prevent the coil terminal wire from bulging outwardly in the radial direction of the stator core due to portions of the coil terminal wire entering into the recesses.

In the above-described coil winding component, a supporting surface of the rib, which is oriented in a radial outward direction of the stator core, may extend along the circumferential direction of the stator core, and may be positioned on a same circumference that passes through the groove bottom surface of the accommodating groove.

In accordance with such a configuration, the coil terminal wire can be accurately aligned in the circumferential direction of the stator core, in a state with the coil terminal wire being arranged in the accommodating groove.

In the above-described coil winding component, a width dimension of the rib along the circumferential direction of the stator core may be substantially the same as a width dimension of each of the recesses along the circumferential direction of the stator core.

In accordance with such a configuration, it is possible to effectively suppress resin shrinkage of the wiring member at the time that the insulator is molded, and it is possible to effectively prevent the coil terminal wire from entering into the recesses.

In the above-described coil winding component, rounded surfaces may be provided on opening edge portions of the recesses.

In accordance with such a configuration, it is possible to prevent damage from occurring to the coil terminal wire due to the opening edge portions of the recesses.

In the above-described coil winding component, a width dimension of the rib may be greater than or equal to two times the radius of the rounded surfaces.

In accordance with such a configuration, the coil terminal wire, which is arranged in the accommodating groove, can be effectively supported by the rib.

A rotary electric machine according to the present invention is characterized by being equipped with a stator in which a plurality of divided core members are arranged in an annular shape, each of the divided core members comprising the above-described coil winding component, and a coil wound around an insulator of the coil winding component, wherein a coil terminal wire is arranged inside an accommodating groove of each of the coil winding components.

According to the present invention, since the ribs that support the coil terminal wires, which are arranged in the accommodating grooves, are provided between the mutually adjacent recesses in the circumferential direction of the stator core, it is possible to suppress a deterioration in the molding accuracy of the insulators, while also preventing portions of the coil terminal wires from bulging outwardly in a radial direction of the stator core, even in the case that the insulators are resin molded integrally with the divided iron cores.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 9A is an explanatory drawing showing a state in which a coil terminal wire is guided through a first accommodating groove and a second accommodating groove of the coil winding component shown in FIG. 3; and FIG. 9B is an explanatory drawing showing a state in which a coil terminal wire is guided through a first accommodating groove and a second accommodating groove of a coil winding component according to a comparative example.

DESCRIPTION OF THE PREFERRED EMBODIMENTS

Preferred embodiments in relation to a coil winding member and a rotary electric machine according to the present invention will be described in detail below with reference to the accompanying drawings.

Figure 1:
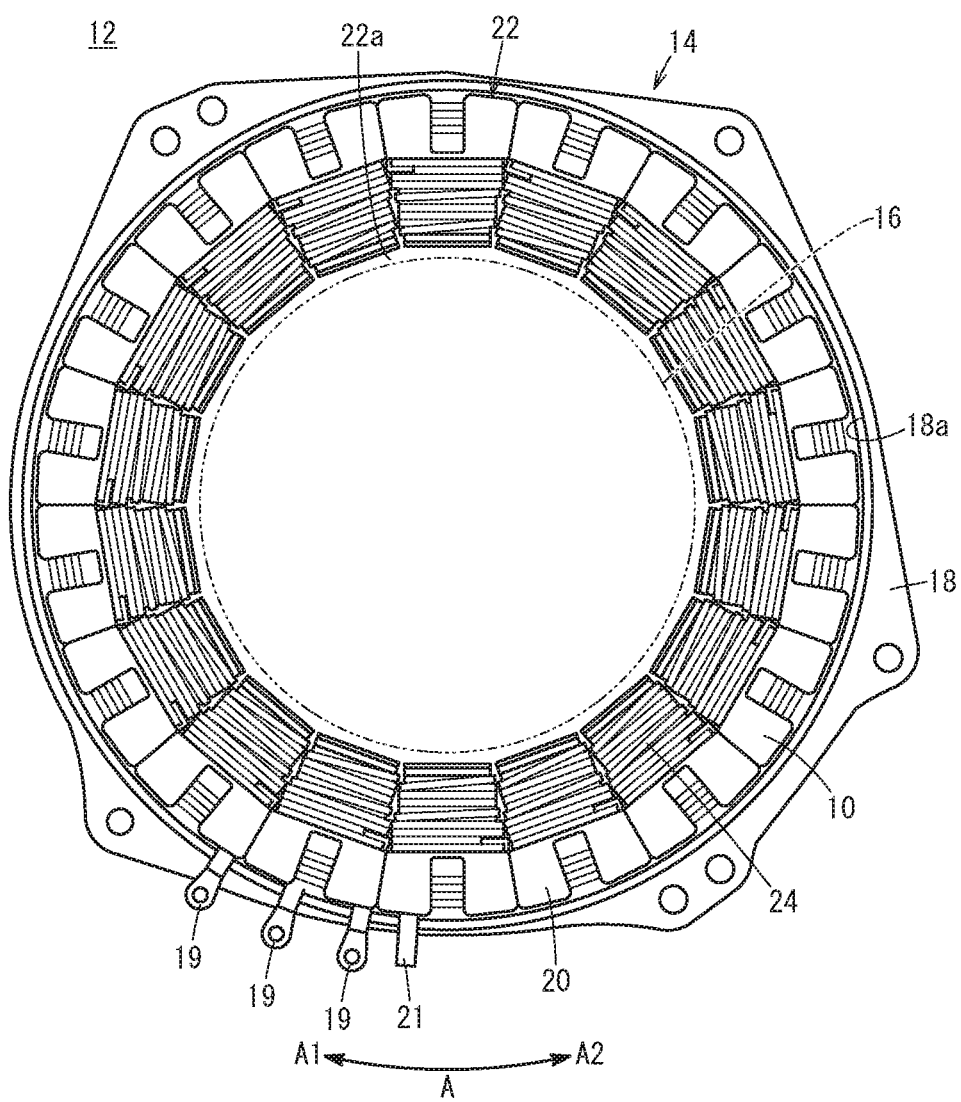
FIG. 1 is a schematic plan view of a rotary electric machine according to an embodiment of the present invention.

As shown in FIG. 1, the rotary electric machine 12 according to the present embodiment is equipped with an annular stator 14, and a rotor 16 disposed inside the stator 14. The rotary electric machine 12 is used as an electric motor or a power generator.

The stator 14 is a so-called three-phase Y-connection type stator, and comprises a hollow holder 18 (housing), three-phase input terminals 19 disposed in the holder 18, a neutral terminal 21 that forms a neutral point, and a plurality of divided core members 20 (eighteen are shown in FIG. 1), which are arranged in an annular shape along an inner circumferential surface 18a of the holder 18. The stator 14 includes a stator core 22, which is constituted by arranging divided iron cores 26 of the divided core members 20 in an annular shape. The rotor 16 is arranged in an interior hole 22a of the stator core 22.

In the following description, the circumferential direction of the stator core 22 defines an A direction, and in particular, a clockwise direction as viewed from the orientation shown in FIG. 1 defines an A1 direction, whereas a counterclockwise direction as viewed from the orientation shown in FIG. 1 defines an A2 direction. Further, the diametrical direction of the stator core 22 defines a B direction, and in particular, an inner diametrical direction of the stator core 22 defines a B1 direction, whereas an outer diametrical direction of the stator core 22 defines a B2 direction. Furthermore, the axial direction of the stator core 22 defines a C direction, and in particular, the upper direction in FIG. 3 defines a C1 direction, whereas the downward direction in FIG. 3 defines a C2 direction. It should be noted that the directions given above are merely for the purpose of facilitating description. It is a matter of course that the rotary electric machine 12 and the constituent elements thereof can be used in any arbitrary orientation (for example, the upward and downward directions may be reversed).

Figure 2:
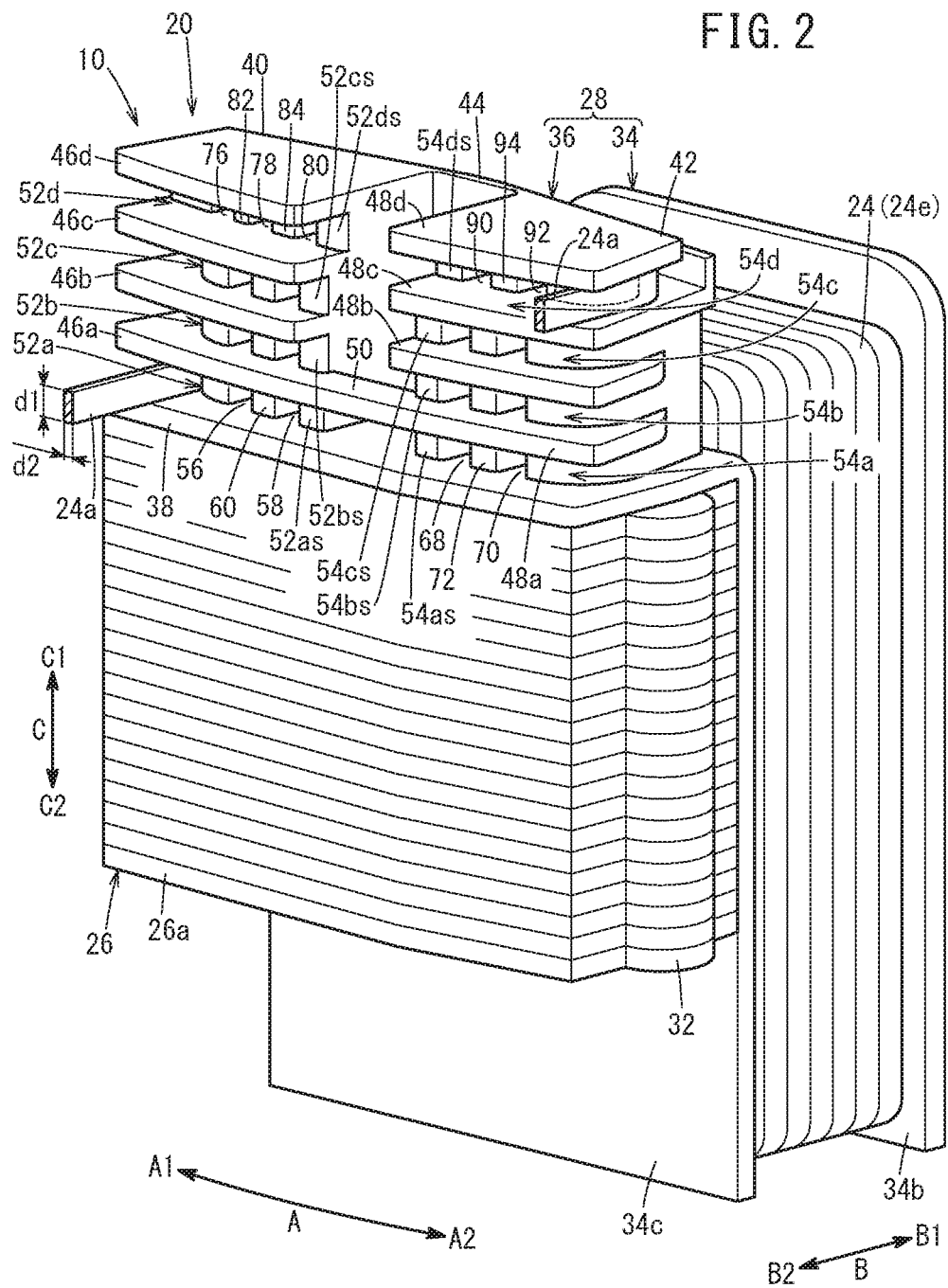
FIG. 2 is a perspective view of a divided core member that constitutes part of the rotary electric machine shown in FIG. 1.

In FIG. 1, the stator 14 contains six each of the divided core members 20, having respective coils 24 in the form of U-phase coils, V-phase coils, and W-phase coils. The divided core members 20 are configured to be identical with each other. As shown in FIG. 2, each of the divided core members 20 includes a coil winding component 10, and a coil 24 which is wound around the coil winding component 10.

Figure 3:
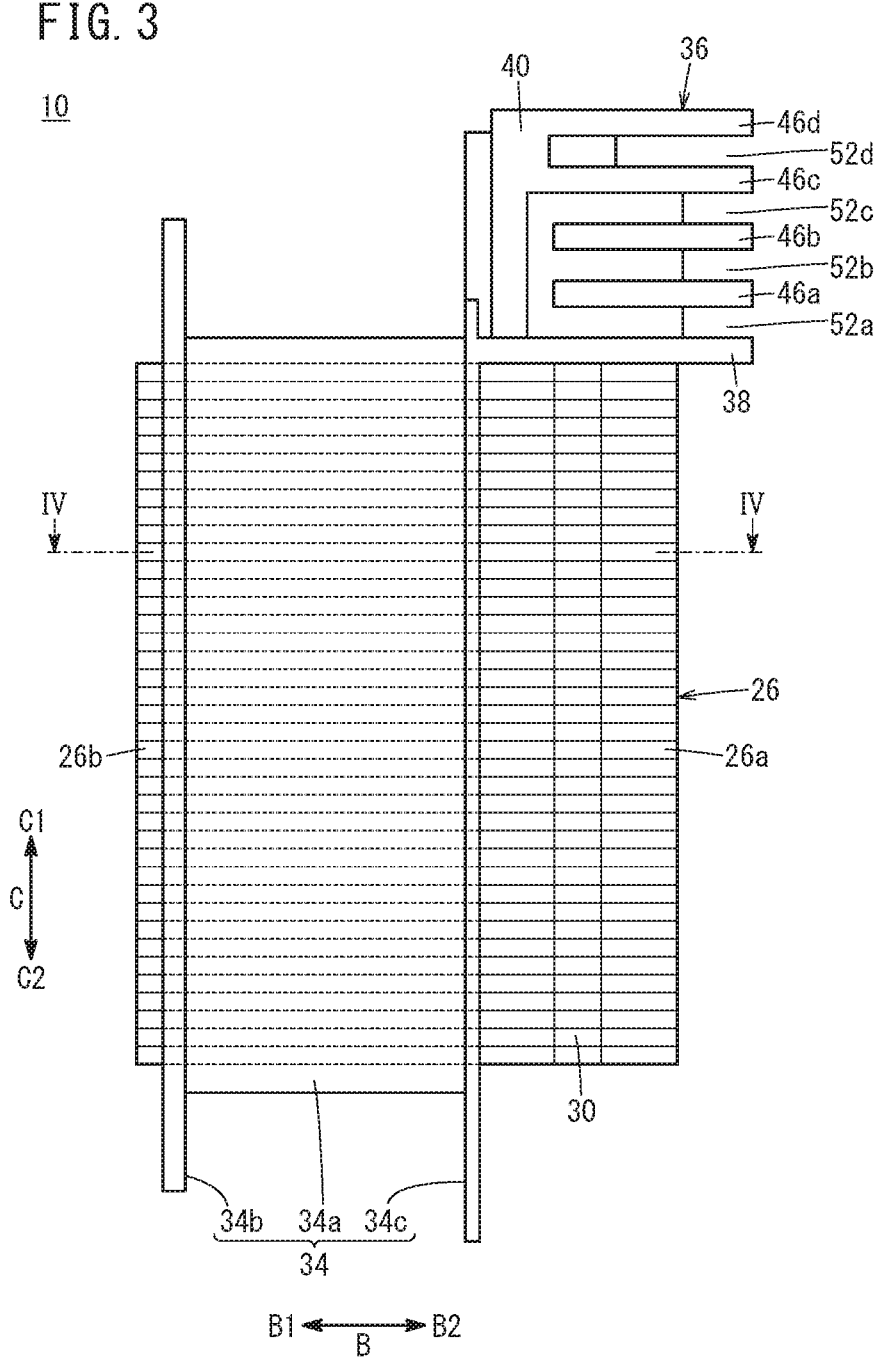
FIG. 3 is a side view of a coil winding component that makes up the divided core member of FIG. 2.
Figure 4:
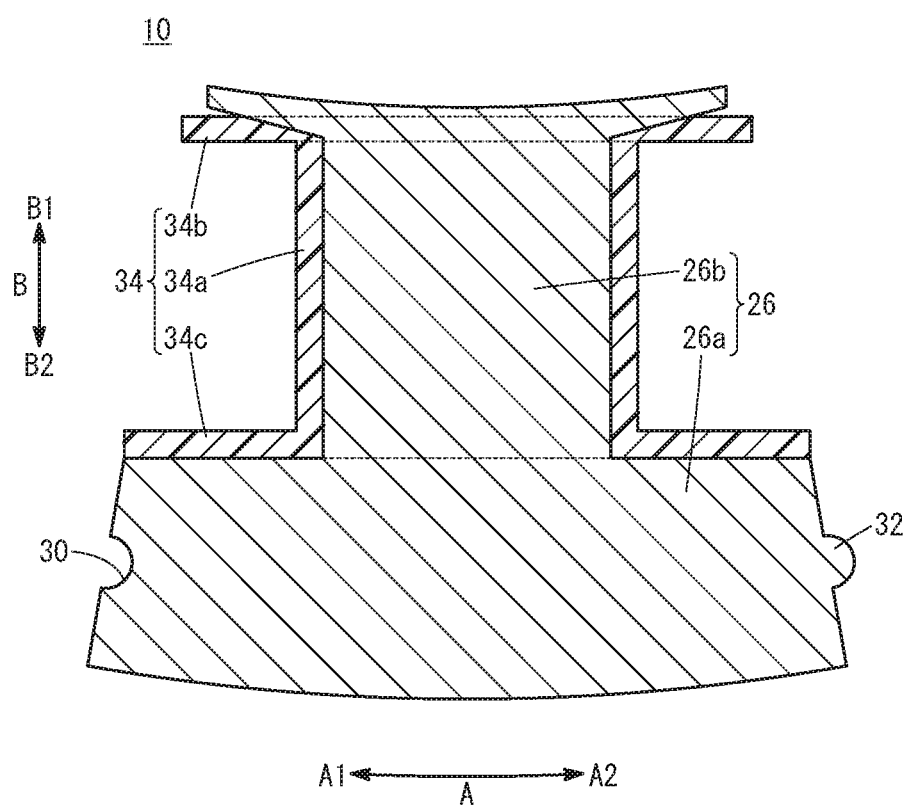
FIG. 4 is a transverse cross-sectional view taken along line IV-IV of FIG. 3.

As shown in FIGS. 2 through 4, the coil winding component 10 includes a divided iron core 26 in which substantially T-shaped metal plates (steel plates), which are punched by a press, are stacked in a plurality of layers, and an insulator 28 that electrically insulates the divided iron core 26.

The divided iron core 26 also includes a yoke portion 26a that extends along the A direction, and a tooth portion 26b (magnetic pole) that extends in the B1 direction from a substantially center region in the A direction of the yoke portion 26a. A substantially semicircular fitting recess 30 is formed in an end in the A1 direction of the yoke portion 26a, and a substantially semicircular fitting projection 32 which is capable of being fitted into the fitting recess 30 is formed in an end in the A2 direction of the yoke portion 26a.

The insulator 28 is a resin made flexible member, and is integrally molded with the divided iron core 26 in surrounding relation to the tooth portion 26b which forms a part of the divided iron core 26. As shown in FIGS. 2 and 3, the insulator 28 includes a winding member 34 around which the coil 24 is capable of being wound, and a wiring member 36 on which a coil terminal wire 24a that is drawn out from the coil 24 is wired (accommodated). The winding member 34 and the wiring member 36 are formed integrally from a resin material. The coil terminal wire 24a is constituted as a flat wire having a rectangular shape as viewed in cross-section. However, the cross-sectional shape of the coil terminal wire 24a may be formed in a circular shape or a square shape.

As shown in FIGS. 2 through 4, the winding member 34 includes a winding member main body 34a formed in a rectangular annular shape, an inner flange 34b that projects from an end portion (inner end portion) in the B1 direction of the winding member main body 34a toward an outer surface side of the winding member main body 34a, together with extending in a circling manner around the inner end portion, and an outer flange 34c that projects from an end portion (outer end portion) in the B2 direction of the winding member main body 34a toward an outer surface side of the winding member main body 34a, together with extending in a circling manner around the outer end portion. The tooth portion 26b is arranged in an interior hole of the winding member main body 34a. On the outer surface of the winding member main body 34a, a coil element wire 24e (conductive wire) is wound whereby the coil 24 is formed (see FIG. 2).

The wiring member 36 is disposed on the outer flange 34c so as to cover substantially the entirety of the yoke portion 26a from the axial direction (C1 direction) of the stator core 22. The wiring member 36 includes a flat plate member 38 extending in the B2 direction from the outer flange 34c, a block-shaped first wall portion 40 and a block-shaped second wall portion 42 which project in the C1 direction from the flat plate member 38 and are arranged mutually in a spaced apart manner in the A direction, and a connecting wall portion 44 that mutually connects ends in the B2 direction of the first wall portion 40 and the second wall portion 42.

Figure 5:
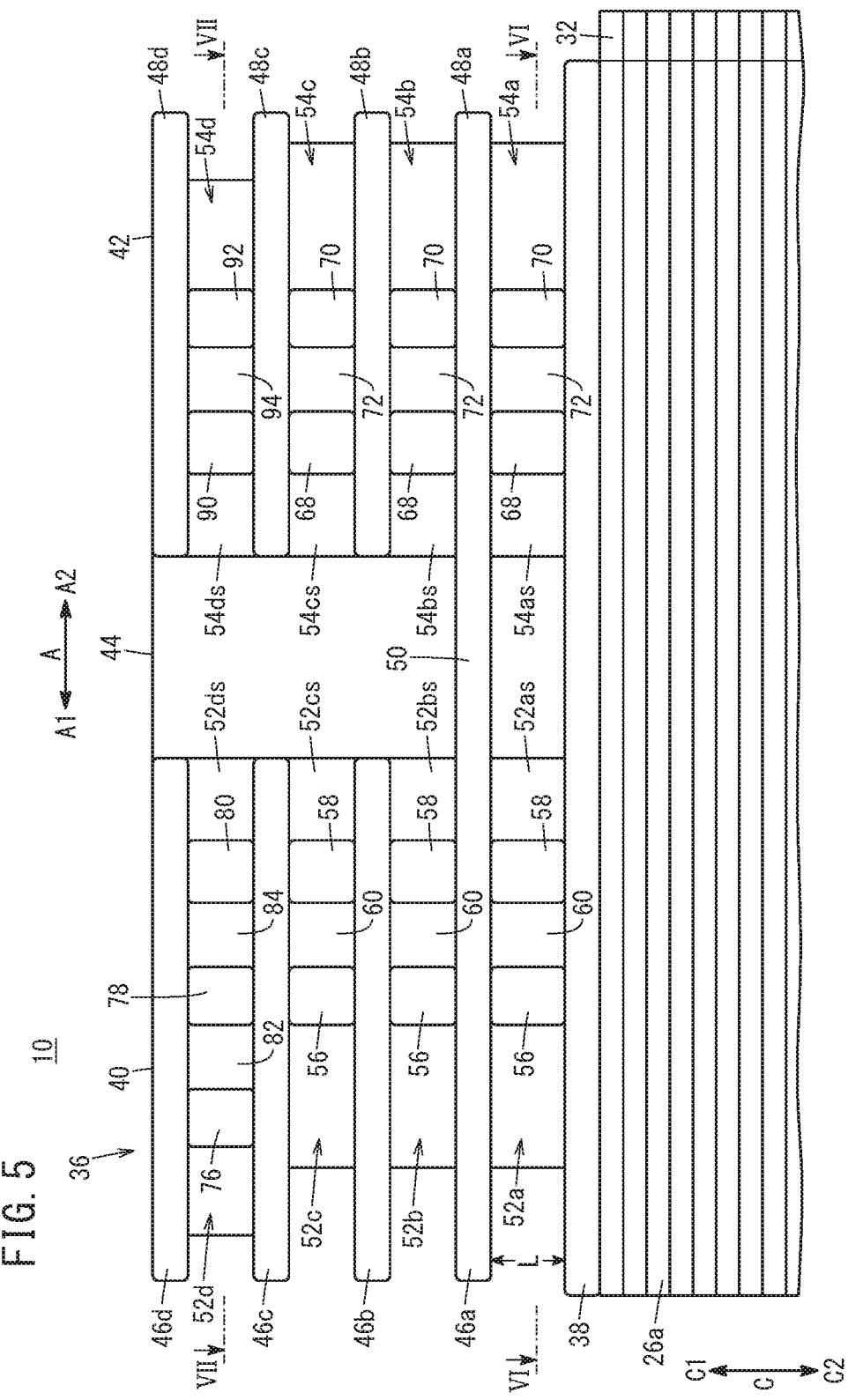
FIG. 5 is a front view of a wiring member of the coil winding component shown in FIG. 3.

As shown in FIGS. 2 and 5, the wiring member 36 includes four first plate members 46a, 46b, 46c, 46d which are extended in the A1 direction and the B2 direction from the first wall portion 40, and four second plate members 48a, 48b, 48c, 48d which are extended in the A2 direction and the B2 direction from the second wall portion 42. The first plate member 46a and the second plate member 48a, which are positioned maximally in the C2 direction, are connected to each other via a connecting plate 50. Each of the first plate members 46a, 46b, 46c, 46d and the second plate members 48a, 48b, 48c, 48d extends in parallel with respect to the flat plate member 38. The four first plate members 46a, 46b, 46c, 46d are positioned at equal intervals in the C direction, and the four second plate members 48a, 48b, 48c, 48d are positioned at equal intervals in the C direction.

With such a wiring member 36, four first accommodating grooves 52a to 52d in which the coil terminal wires 24a can be arranged are formed on the side of the first wall portion 40, and four second accommodating grooves 54a to 54d in which the coil terminal wires 24a can be arranged are formed on the side of the second wall portion 42. More specifically, on the outer end surface of the wiring member 36, which is oriented in a radial outward direction of the stator core 22, the first accommodating grooves 52a to 52d and the second accommodating grooves 54a to 54d are formed to extend along the circumferential direction of the stator core 22, and in which the coil terminal wires 24a drawn out from the coil 24 are capable of being arranged.

In the first accommodating groove 52a and the second accommodating groove 54a, which are positioned mutually at the same height, the coil terminal wire 24a that is drawn out, for example, from the W-phase coil 24 is accommodated. In the first accommodating groove 52b and the second accommodating groove 54b, which are positioned mutually at the same height, the coil terminal wire 24a that is drawn out, for example, from the V-phase coil 24 is accommodated. In the first accommodating groove 52c and the second accommodating groove 54c, which are positioned mutually at the same height, the coil terminal wire 24a that is drawn out, for example, from the U-phase coil 24, is accommodated. In the first accommodating groove 52d and the second accommodating groove 54d, which are positioned mutually at the same height, the coil terminal wires 24a that are drawn out as neutral lines from the respective coils 24 are accommodated.

In FIG. 5, the respective first accommodating grooves 52a to 52d and the second accommodating grooves 54a to 54d open in a diametrical outward direction of the stator core 22, together with extending in the circumferential direction of the stator core 22. Groove widths L of the respective first accommodating grooves 52a to 52d and the second accommodating grooves 54a to 54d are substantially the same, and are formed to be slightly greater than the long sides d1 of the transverse cross section of the coil terminal wire 24a (see FIG. 2). The groove depths of the respective first accommodating groove 52d and the second accommodating groove 54d in which the coil terminal wire 24a as a neutral line is accommodated are deeper than the groove depths of the respective first accommodating grooves 52a to 52c and the second accommodating grooves 54a to 54c in which the U-phase to W-phase coil terminal wires 24a are accommodated (see FIGS. 6 and 7).

Figure 6:
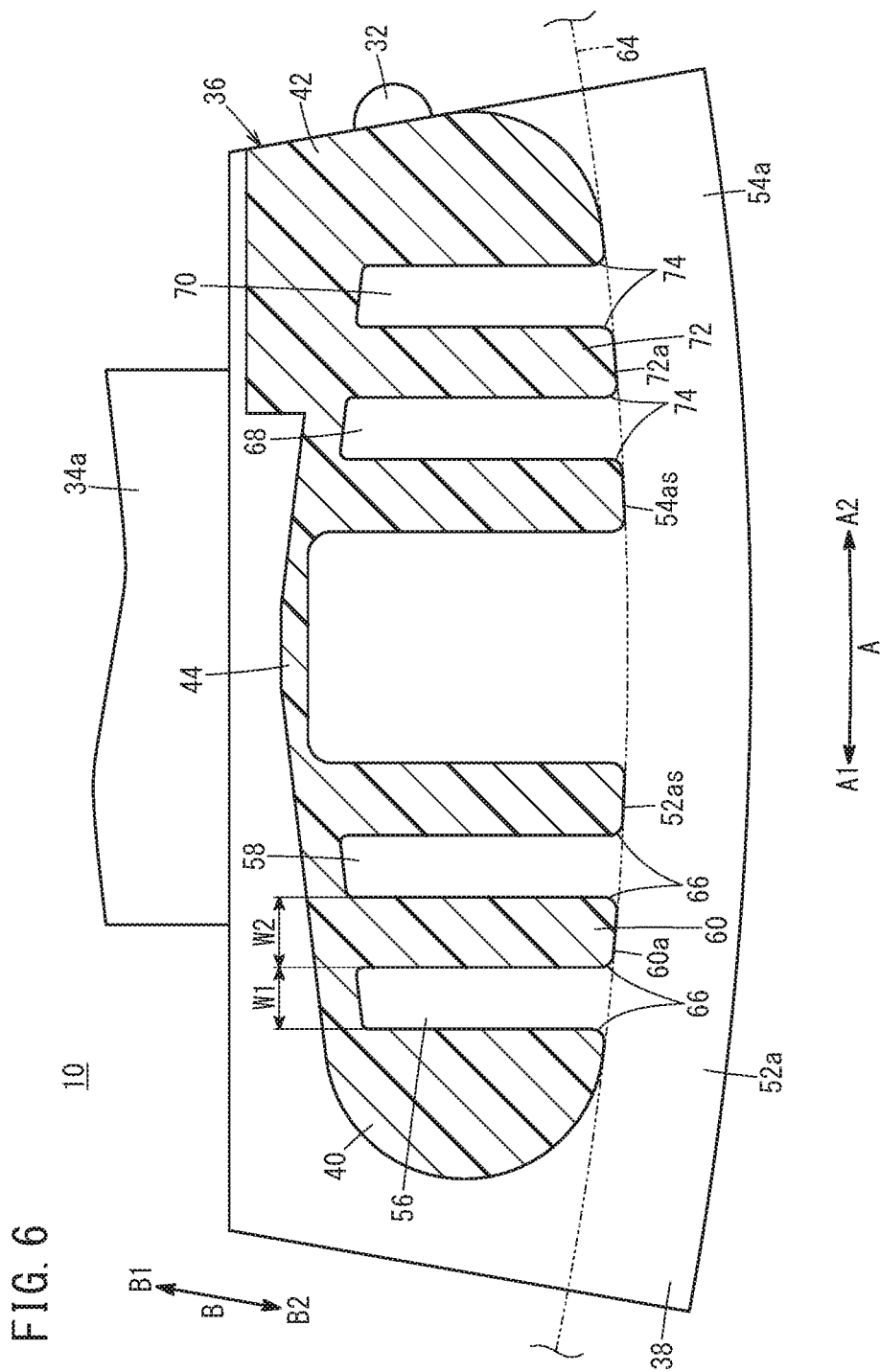
FIG. 6 is a transverse cross-sectional view taken along line VI-VI of FIG. 5.

As shown in FIGS. 5 and 6, a plurality of recesses 56, 58 (two are shown in FIG. 6) are formed in the circumferential direction of the stator core 22 on a groove bottom surface 52as of the first accommodating groove 52a in which the W-phase coil terminal wire 24a is arranged. Further, a rib 60, which supports the coil terminal wire 24a that is arranged in the first accommodating groove 52a, is disposed between the mutually adjacent recesses 56, 58 in the circumferential direction of the stator core 22. The recesses 56, 58 function as hollow portions of the wiring member 36 and extend in the B direction.

A supporting surface 60a of the rib 60, which is oriented in a radial outward direction (B2 direction) of the stator core 22, extends along the circumferential direction of the stator core 22, and is positioned on the same circumference 64 that passes through the groove bottom surface 52as of the first accommodating groove 52a. Rounded surfaces 66 are provided on opening edge portions of the recesses 56, 58. The supporting surface 60a is a surface positioned between the two rounded surfaces 66 of the rib 60, and is formed to be substantially flat. Consequently, the coil terminal wire 24a can be reliably supported by the supporting surface 60a. The radius of the rounded surfaces 66 is smaller than a dimension of a short side d2 of the transverse cross section of the coil terminal wire 24a. As the radius of the rounded surfaces 66 becomes larger, it is possible to prevent damage from occurring to the coil terminal wire 24a due to the rounded surfaces 66, and as the radius thereof becomes smaller, the opening width of the recesses 56, 58 can be made smaller (the supporting surface 60a can be made larger). The radius of the rounded surfaces 66 is set based on the size of the stator core 22 and the like.

The width dimensions W1 of the two recesses 56, 58 along the circumferential direction of the stator core 22 are the same. The width dimension W2 of the rib 60 along the circumferential direction of the stator core 22 is substantially the same as the width dimension W1 of the respective recesses 56, 58. The width dimensions W1, W2 are greater than the short side d2 of the transverse cross section of the coil terminal wire 24a (see FIG. 2). The width dimension W2 of the rib 60 is greater than or equal to two times the radius of the rounded surfaces 66.

A plurality of recesses 68, 70 (two are shown in FIG. 6) are formed in the circumferential direction of the stator core 22 on a groove bottom surface 54as of the second accommodating groove 54a in which the W-phase coil terminal wire 24a is arranged. Further, a rib 72, which supports the coil terminal wire 24a that is arranged in the second accommodating groove 54a, is disposed between the mutually adjacent recesses 68, 70 in the circumferential direction of the stator core 22. The recesses 68, 70 and the rib 72 are of shapes which are inverted to the left and right from the aforementioned recesses 56, 58 and the rib 60.

A supporting surface 72a of the rib 72, which is oriented in a radial outward direction (B2 direction) of the stator core 22, extends along the circumferential direction of the stator core 22, and is positioned on the same circumference 64 that passes through the groove bottom surface 54as of the second accommodating groove 54a. Rounded surfaces 74 are provided on opening edge portions of the recesses 68, 70. The rounded surfaces 74 are configured in the same manner as the rounded surfaces 66 of the aforementioned rib 60. The same feature applies to the rounded surfaces 88, 96 which will be described later. The supporting surface 72a is a surface positioned between the two rounded surfaces 74 of the rib 72, and is formed to be substantially flat. Consequently, the coil terminal wire 24a can be reliably supported by the supporting surface 72a.

As shown in FIG. 5, in the same manner as the groove bottom surface 52as of the above-described first accommodating groove 52a, two recesses 56, 58 are formed and one rib 60 is disposed on the groove bottom surfaces 52bs, 52cs of the first accommodating grooves 52b, 52c in which the U-phase and V-phase coil terminal wires 24a are arranged. In the same manner as the groove bottom surface 54as of the above-described second accommodating groove 54a, two recesses 68, 70 are formed and one rib 72 is disposed on the groove bottom surfaces 54bs, 54cs of the second accommodating grooves 54b, 54c in which the U-phase and V-phase coil terminal wires 24a are arranged.

Figure 7:
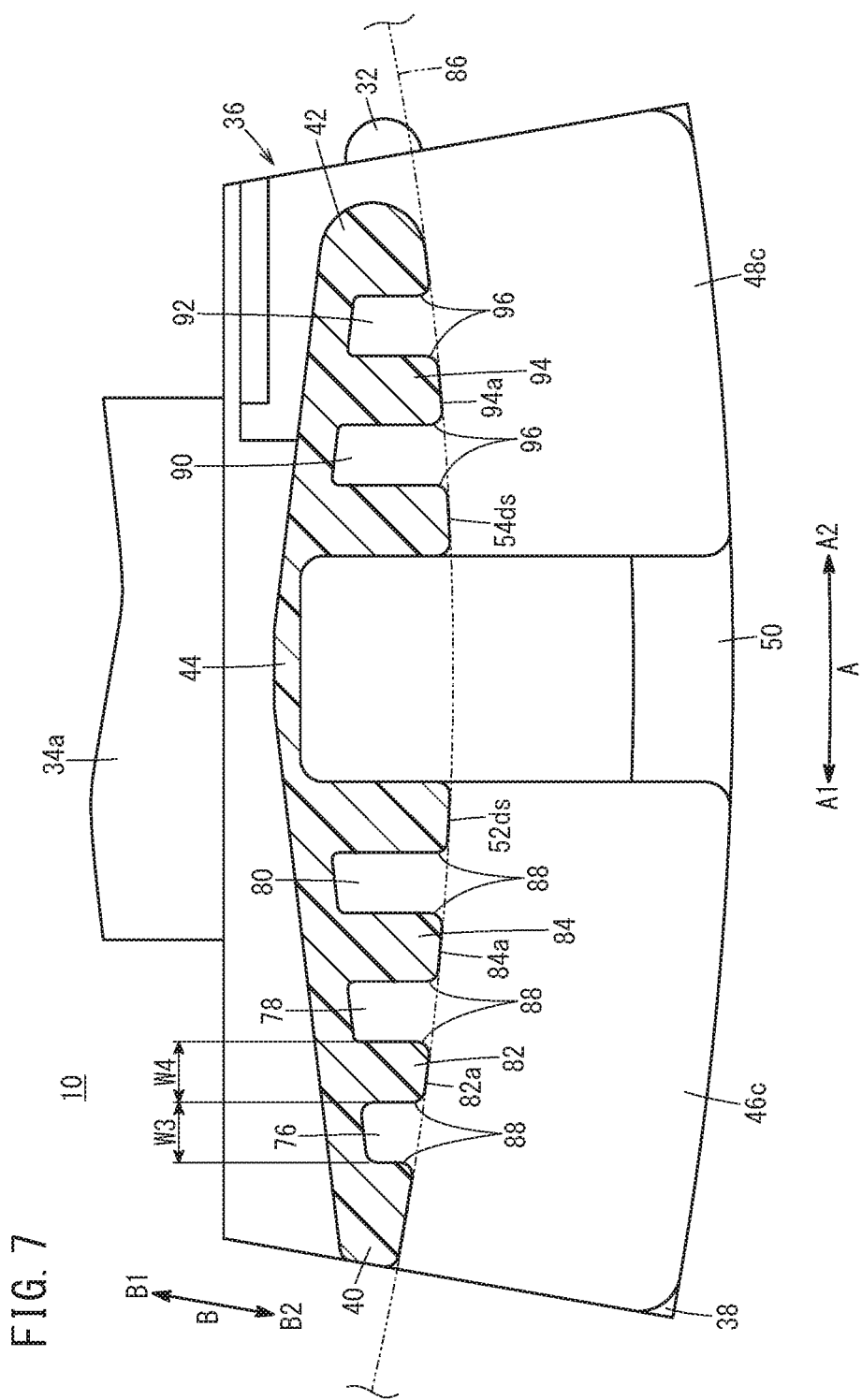
FIG. 7 is a transverse cross-sectional view taken along line VII-VII of FIG. 5.

As shown in FIGS. 5 and 7, a plurality of recesses 76, 78, 80 (three are shown in FIG. 7) are formed in the circumferential direction of the stator core 22 on a groove bottom surface 52ds of the first accommodating groove 52d in which the coil terminal wire 24a of the neutral line is arranged. Further, ribs 82, 84, which support the coil terminal wire 24a that is arranged in the first accommodating groove 52d, are disposed between the mutually adjacent recesses 76, 78, 80 in the circumferential direction of the stator core 22. The recesses 76, 78, 80 function as hollow portions of the wiring member 36 and extend in the B direction.

Supporting surfaces 82a, 84a of the ribs 82, 84, which are oriented in a radial outward direction (B2 direction) of the stator core 22, extend along the circumferential direction of the stator core 22, and are positioned on the same circumference 86 that passes through the groove bottom surface 52ds of the first accommodating groove 52d. Rounded surfaces 88 are provided on opening edge portions of the recesses 76, 78, 80. The supporting surface 82a is a surface positioned between the two rounded surfaces 88 of the rib 82, and is formed to be substantially flat. The supporting surface 84a is a surface located between the two rounded surfaces 88 of the rib 84, and is formed to be substantially flat. Consequently, the coil terminal wire 24a can be reliably supported by the supporting surfaces 82a, 84a.

The width dimensions W3 of the respective recesses 76, 78, 80 along the circumferential direction of the stator core 22 are mutually the same, and the width dimensions W4 of the respective ribs 82, 84 along the circumferential direction of the stator core 22 are mutually the same. The width dimension W4 of the respective ribs 82, 84 is substantially the same as the width dimension W3 of the respective recesses 76, 78, 80. The width dimensions W3, W4 are greater than the short side d2 of the transverse cross section of the coil terminal wire 24a (see FIG. 2). The width dimension W4 of the ribs 82, 84 is greater than or equal to two times the radius of the rounded surfaces 88.

A plurality of recesses 90, 92 (two are shown in FIG. 7) are formed in the circumferential direction of the stator core 22 on a groove bottom surface 54ds of the second accommodating groove 54d in which the coil terminal wire 24a of the neutral line is arranged. Further, a rib 94, which supports the coil terminal wire 24a that is arranged in the second accommodating groove 54d, is disposed between the mutually adjacent recesses 90, 92 in the circumferential direction of the stator core 22. The recesses 90, 92 are formed by making the groove depth in the B1 direction of the aforementioned recesses 68, 70 shallower, and the rib 94 is formed by making the length dimension of the aforementioned rib 72 in the direction B shorter.

A supporting surface 94a of the rib 94, which is oriented in a radial outward direction (B2 direction) of the stator core 22, extends along the circumferential direction of the stator core 22, and is positioned on the same circumference 86 that passes through the groove bottom surface 54ds of the second accommodating groove 54d. Rounded surfaces 96 are provided on opening edge portions of the recesses 90, 92. The supporting surface 94a is a surface positioned between the two rounded surfaces 96 of the rib 94, and is formed to be substantially flat. Consequently, the coil terminal wire 24a can be reliably supported by the supporting surface 94a.

Figure 8:
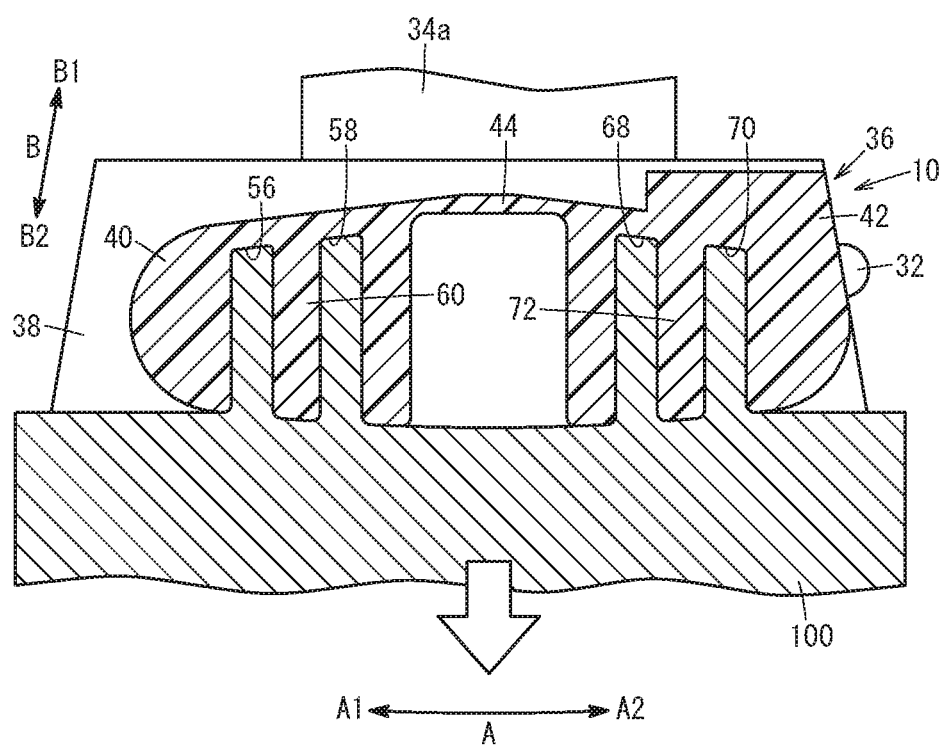
FIG. 8 is a cross-sectional explanatory drawing of a molding process of an insulator.

As shown in FIG. 8, the recesses 56, 58, 68, 70, 76, 78, 80, 90, 92 and the ribs 60, 72, 82, 84, 94 are formed by a hollow portion molding die 100 which is capable of sliding in the B direction. More specifically, even if the insulator 28 is resin molded integrally with the divided iron core 26 (in the case that the yoke portion 26a is positioned in the C2 direction of the wiring member 36), the recesses 56, 58, 68, 70, 76, 78, 80, 90, 92 and the ribs 60, 72, 82, 84, 94 can be easily and reliably molded.

In the case of manufacturing the stator 14 of the rotary electric machine 12 of the present embodiment, as shown in FIG. 2, the coil element wire 24e is wound around the winding members 34 of each of the coil winding components 10, whereby respective divided core members 20 having the coils 24 are formed. Then, the divided core members 20 are arranged in an annular shape along the inner circumferential surface 18a of the holder 18, and the coil terminal wires 24a thereof are drawn outward in the radial direction (B2 direction) of the stator core 22. Thereafter, the coil terminal wires 24a of the respective phases are guided through the corresponding first accommodating grooves 52a to 52c and the second accommodating grooves 54a to 54c, and the coil terminal wire 24a of the neutral line is guided through the first accommodating groove 52d and the second accommodating groove 54d.

At this time, as shown in FIG. 9A, the coil terminal wires 24a are inserted into the first accommodating grooves 52a to 52d and the second accommodating grooves 54a to 54d while being pressed in the B1 direction by a roller insertion jig 102. The coil terminal wires 24a arranged in the first accommodating grooves 52a to 52c and the second accommodating grooves 54a to 54c are joined to their corresponding input terminals 19, whereas the coil terminal wires 24a arranged in the first accommodating grooves 52d and the second accommodating grooves 54d are joined to the neutral terminal 21. Consequently, in this manner, the stator 14 of the rotary electric machine 12 is manufactured.

Next, advantages and effects of the coil winding component 10 and the rotary electric machine 12 according to the present embodiment will be described.

The coil winding component 10 is equipped with the divided iron core 26, and the insulator 28 which is resin molded integrally with the divided iron core 26 in surrounding relation to a portion of the divided iron core 26. A plurality of the divided iron cores 26 are arranged in an annular shape to thereby constitute the stator core 22. The coil 24 is capable of being wound via the insulator 28 around the tooth portion 26b of the divided iron core 26.

The insulator 28 includes the wiring member 36, which is disposed in covering relation to the yoke portion 26a of the divided iron core 26 from the axial direction (C1 direction) of the stator core 22. On the outer end surface of the wiring member 36, which is oriented in a radial outward direction (B2 direction) of the stator core 22, the first accommodating grooves 52a to 52d and the second accommodating grooves 54a to 54d are formed to extend along the circumferential direction (A direction) of the stator core 22, and in which the coil terminal wires 24a drawn out from the coil 24 are capable of being arranged.

As shown in FIGS. 5 and 6, a plurality of recesses 56, 58 are formed in the circumferential direction of the stator core 22 on the groove bottom surfaces 52as to 52cs of the first accommodating grooves 52a to 52c. Further, the ribs 60, which support the coil terminal wires 24a that are arranged in the first accommodating grooves 52a to 52c, are disposed between the mutually adjacent recesses 56, 58 in the circumferential direction of the stator core 22. A plurality of recesses 68, 70 are formed in the circumferential direction of the stator core 22 on the groove bottom surfaces 54as to 54cs of the second accommodating grooves 54a to 54c. Further, ribs 72, which support the coil terminal wires 24a that are arranged in the second accommodating grooves 54a to 54c, are disposed between the mutually adjacent recesses 68, 70 in the circumferential direction of the stator core 22.

As shown in FIGS. 5 and 7, a plurality of recesses 76, 78, 80 are formed in the circumferential direction of the stator core 22 on the groove bottom surface 52ds of the first accommodating groove 52d. Further, the ribs 82, 84, which support the coil terminal wire 24a that is arranged in the first accommodating groove 52d, are disposed between the mutually adjacent recesses 76, 78, 80 in the circumferential direction of the stator core 22. A plurality of recesses 90, 92 are formed in the circumferential direction of the stator core 22 on the groove bottom surface 54ds of the second accommodating groove 54d. Further, the rib 94, which supports the coil terminal wire 24a that is arranged in the second accommodating groove 54d, is disposed between the mutually adjacent recesses 90, 92 in the circumferential direction of the stator core 22.

According to such a configuration, since the plurality of recesses 56, 58, 68, 70, 76, 78, 80, 90, 92 function as hollow portions of the wiring member 36, it is possible to reduce the amount of resin shrinkage of the wiring member 36, in comparison with a case in which such recesses 56, 58, 68, 70, 76, 78, 80, 90, 92 are not formed at the time of molding the insulator 28. Consequently, even if the insulator 28 is resin molded integrally with the divided iron core 26, it is possible to suppress a deterioration in the molding accuracy of the insulator 28.

Incidentally, in the comparative example shown in FIG. 9B, for example, a comparatively large single recess 104 is formed in the groove bottom surface 52as of the first accommodating groove 52a and the rib 60 is not provided therein, and in addition, a comparatively large single recess 106 is formed in the groove bottom surface 54as of the second accommodating groove 54a and the rib 72 is not provided therein. In this case, when the roller insertion jig 102 is used and the coil terminal wire 24a is inserted into the first accommodating groove 52a and the second accommodating groove 54a, portions of the coil terminal wire 24a enter into the recesses 104, 106, and in reaction thereto, portions of the coil terminal wire 24a positioned on both sides in the A direction of the recesses 104, 106 bulge outwardly in the radial direction (B2 direction) of the stator core 22.

However, as shown in FIG. 9A, since the rib 60 is disposed between the mutually adjacent recesses 56, 58 in the circumferential direction of the stator core 22, and the rib 72 is disposed between the mutually adjacent recesses 68, 70 in the circumferential direction of the stator core 22, it is possible to prevent the coil terminal wire 24a from entering into the recesses 56, 58, 68, 70. Thus, it is possible to prevent the coil terminal wire 24a from bulging outwardly in the radial direction of the stator core 22 due to portions of the coil terminal wire 24a entering into the recesses 56, 58, 68, 70. Moreover, in FIG. 9A, although an example is shown in which the coil terminal wire 24a is guided through the first accommodating groove 52a and the second accommodating groove 54a, the same effect is achieved in the case of guiding the coil terminal wire 24a in the first accommodating grooves 52b to 52d and the second accommodating grooves 54b to 54d.

The supporting surfaces 60a, 72a of the ribs 60, 72, which are oriented in a radial outward direction of the stator core 22, extend along the circumferential direction of the stator core 22, and are positioned on the same circumference 64 that passes through the groove bottom surface 52as of the first accommodating groove 52a and the groove bottom surface 54as of the second accommodating groove 54a. The same feature applies to the first accommodating grooves 52b, 52c and the second accommodating grooves 54b, 54c. Further, the supporting surfaces 82a, 84a, 94a of the ribs 82, 84, 94, which are oriented in a radial outward direction of the stator core 22, extend along the circumferential direction of the stator core 22, and are positioned on the same circumference 86 that passes through the groove bottom surface 52ds of the first accommodating groove 52d and the groove bottom surface 54ds of the second accommodating groove 54d. In accordance with this feature, the coil terminal wires 24a can be accurately aligned in the circumferential direction of the stator core 22, in a state with the coil terminal wires 24a accommodated in the interior of the first accommodating grooves 52a to 52d and the second accommodating grooves 54a to 54d.

The width dimension W2 of the rib 60 along the circumferential direction of the stator core 22 is substantially the same as the width dimension W1 of the respective recesses 56, 58 along the circumferential direction of the stator core 22. Therefore, it is possible to effectively suppress resin shrinkage of the wiring member 36 at the time that the insulator 28 is molded, and it is possible to effectively prevent the coil terminal wire 24a from entering into the recesses 56, 58. Since the rib 72 and the recesses 68, 70 are of shapes which are inverted to the left and right from the rib 60 and the recesses 56, 58, the same effects are exhibited as well concerning the second accommodating grooves 54*a* to 54*c*. Further, since the rib 94 and the recesses 90, 92 are obtained by changing the dimension in the B direction of the rib 72 and the recesses 68, 70, the same effects are exhibited as well concerning the second accommodating groove 54*d*. The width dimension W4 of the ribs 82, 84 along the circumferential direction of the stator core 22 is substantially the same as the width dimension W3 of the respective recesses 76, 78, 80 along the circumferential direction of the stator core 22. Therefore, it is possible to effectively suppress resin shrinkage of the wiring member 36 at the time that the insulator 28 is molded, and it is possible to effectively prevent the coil terminal wire 24*a* from entering into the recesses 76, 78, 80.

Since the rounded surfaces 66, 74, 88, 96 are formed on the opening edge portions of the recesses 56, 58, 68, 70, 76, 78, 80, 90, 92, it is possible to prevent damage from occurring to the coil terminal wires 24*a* due to the opening edge portions of the recesses 56, 58, 68, 70, 76, 78, 80, 90, 92.

The present invention is not limited to the configurations described above. Three or more recesses may be formed, and two or more ribs may be provided in the circumferential direction of the stator core 22, on the groove bottom surfaces 52*as* to 52*cs* of the first accommodating grooves 52*a* to 52*c* and the groove bottom surfaces 54*as* to 54*ds* of the second accommodating grooves 54*a* to 54*d*. Moreover, on the groove bottom surface 52*ds* of the first accommodating groove 52*d*, four or more recesses may be formed, and three or more ribs may be provided in the circumferential direction of the stator core 22, while in addition, two recesses may be formed and one rib may be provided in the circumferential direction of the stator core 22.

The coil winding component and the rotary electric machine according to the present invention are not limited to the embodiments described above, and various additional or modified structures may be adopted therein without departing from the scope and essence of the invention as set forth in the appended claims.

What is claimed is:

1. A coil winding component being equipped with a divided iron core, and a resin insulator, which is resin molded integrally with the divided iron core in surrounding relation to a portion of the divided iron core, wherein a stator core of a stator is constituted by arranging a plurality of the divided iron cores in an annular shape, and a coil is capable of being wound via the insulator around a tooth portion of the divided iron core, and further wherein:
   the insulator includes a wiring member, which is disposed so as to cover a yoke portion of the divided iron core from an axial direction of the stator core;
   an accommodating groove, which extends along a circumferential direction of the stator core, and in which a coil terminal wire drawn out from the coil can be arranged, is formed on an outer end surface of the wiring member in a radial outward direction of the stator core;
   a plurality of recesses are formed in the circumferential direction of the stator core on a groove bottom surface of the accommodating groove; and
   a rib, which supports the coil terminal wire that is arranged in the accommodating groove, is disposed between mutually adjacent recesses in the circumferential direction of the stator core.

2. The coil winding component according to claim 1, wherein a supporting surface of the rib, which is oriented in a radial outward direction of the stator core, extends along the circumferential direction of the stator core, and is positioned on a same circumference that passes through the groove bottom surface of the accommodating groove.

3. The coil winding component according to claim 1, wherein a width dimension of the rib along the circumferential direction of the stator core is substantially the same as a width dimension of each of the recesses along the circumferential direction of the stator core.

4. The coil winding component according to claim 1, wherein rounded surfaces are provided on opening edge portions of the recesses.

5. The coil winding component according to claim 4, wherein a width dimension of the rib is greater than or equal to two times a radius of the rounded surfaces.

6. A rotary electric machine equipped with a stator in which a plurality of divided core members are arranged in an annular shape;
   each of the divided core members comprising:
   the coil winding component according to claim 1; and
   a coil wound around an insulator of the coil winding component;
   wherein a coil terminal wire is arranged inside an accommodating groove of each of the coil winding components,
   the coil winding component being equipped with a divided iron core, and the insulator, which is resin molded
   integrally with the divided iron core in surrounding relation to a portion of the divided iron core, wherein a stator core of a stator is constituted by arranging a plurality of the divided iron cores in an annular shape, and the coil is capable of being wound via the insulator around a tooth portion of the divided iron core, and further wherein:
   the insulator includes a wiring member, which is disposed so as to cover a yoke portion of the divided iron core from an axial direction of the stator core;
   the accommodating groove, which extends along a circumferential direction of the stator core, and in which the coil terminal wire drawn out from the coil can be arranged, is formed on an outer end surface of the wiring member in a radial outward direction of the stator core;
   a plurality of recesses are formed in the circumferential direction of the stator core on a groove bottom surface of the accommodating groove; and
   a rib, which supports the coil terminal wire that is arranged in the accommodating groove, is disposed between mutually adjacent recesses in the circumferential direction of the stator core.

7. The rotary electric machine according to claim 6, wherein a supporting surface of the rib, which is oriented in a radial outward direction of the stator core, extends along the circumferential direction of the stator core, and is positioned on a same circumference that passes through the groove bottom surface of the accommodating groove.

8. The rotary electric machine according to claim 6, wherein a width dimension of the rib along the circumferential direction of the stator core is substantially the same as a width dimension of each of the recesses in the circumferential direction of the stator core.

9. The rotary electric machine according to claim 6, wherein rounded surfaces are provided on opening edge portions of the recesses.

10. The rotary electric machine according to claim 9, wherein a width dimension of the rib is greater than or equal to two times a radius of the rounded surfaces.

* * * * *